Aug. 7, 1923.

A. A. GAZDA

CONTROL SYSTEM

Filed Feb. 7, 1921

1,463,947

5 Sheets-Sheet 4

Inventor
Adolph A. Gazda
By Miller Chadwick Parker
Attys

Aug. 7, 1923.
A. A. GAZDA
1,463,947
CONTROL SYSTEM
Filed Feb. 7, 1921
5 Sheets-Sheet 5
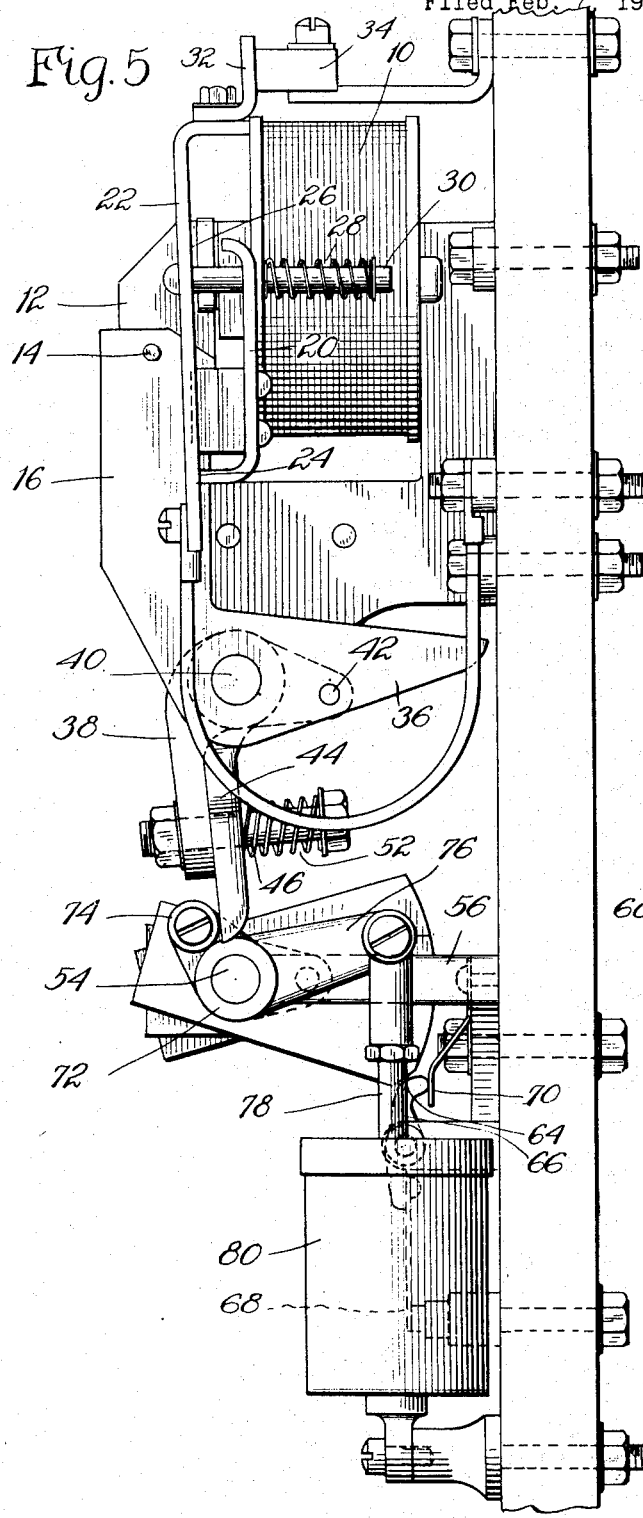
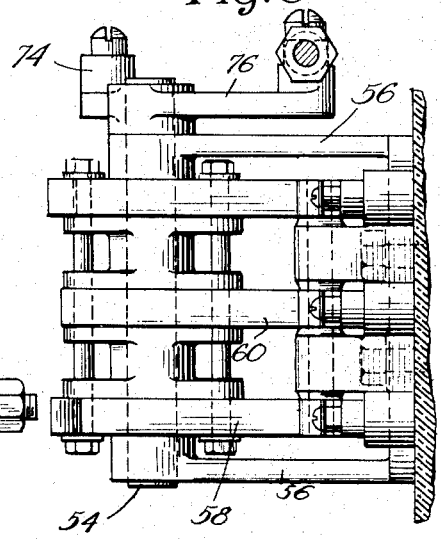
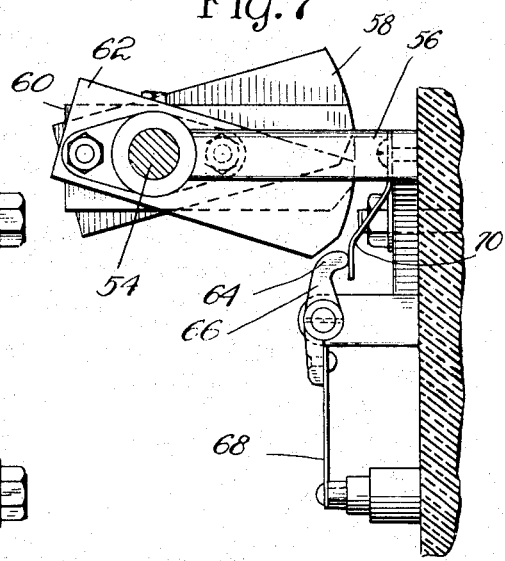
Inventor
Adolph A. Gazda Patented Aug. 7, 1923.

1,463,947

UNITED STATES PATENT OFFICE.

ADOLPH A. GAZDA, OF CHICAGO, ILLINOIS, ASSIGNOR TO KAESTNER & HECHT COMPANY, OF CHICAGO, ILLINOIS, A CORPORATION OF ILLINOIS.

CONTROL SYSTEM.

Application filed February 7, 1921. Serial No. 442,927.

*To all whom it may concern:*

Be it known that I, ADOLPH A. GAZDA, a citizen of the United States, residing at Chicago, in the county of Cook and State of Illinois, have invented certain new and useful Improvements in Control Systems, of which the following is a specification.

My invention relates to control systems for electric elevators and more specifically to an improved system for controlling an elevator driven by alternating current either by means of a hand lever or by push buttons, said system providing two speeds for the car in either direction.

A special object of the invention is to provide a control system such that when the hand lever controlling it is thrown instantly to the high speed position, the car will be brought to a sufficient speed before the high speed connections become operative, to prevent too rapid acceleration. The system nevertheless provides two speeds at the will of the operator as the controller may be held in low speed position indefinitely to move the car at low speed.

Another object is to automatically accelerate the car in going from a standstill to low speed and decelerate in changing from high speed to low speed by means of a single set of resistances and switches. I accomplish this by the use of a single dashpot and automatic connections arranged to actuate the dashpot to close a series of contacts in timed sequence during either acceleration from a standstill to low speed, or deceleration from high to low speed.

Other objects and advantages of my invention will become apparent as the description proceeds.

Figure 1:
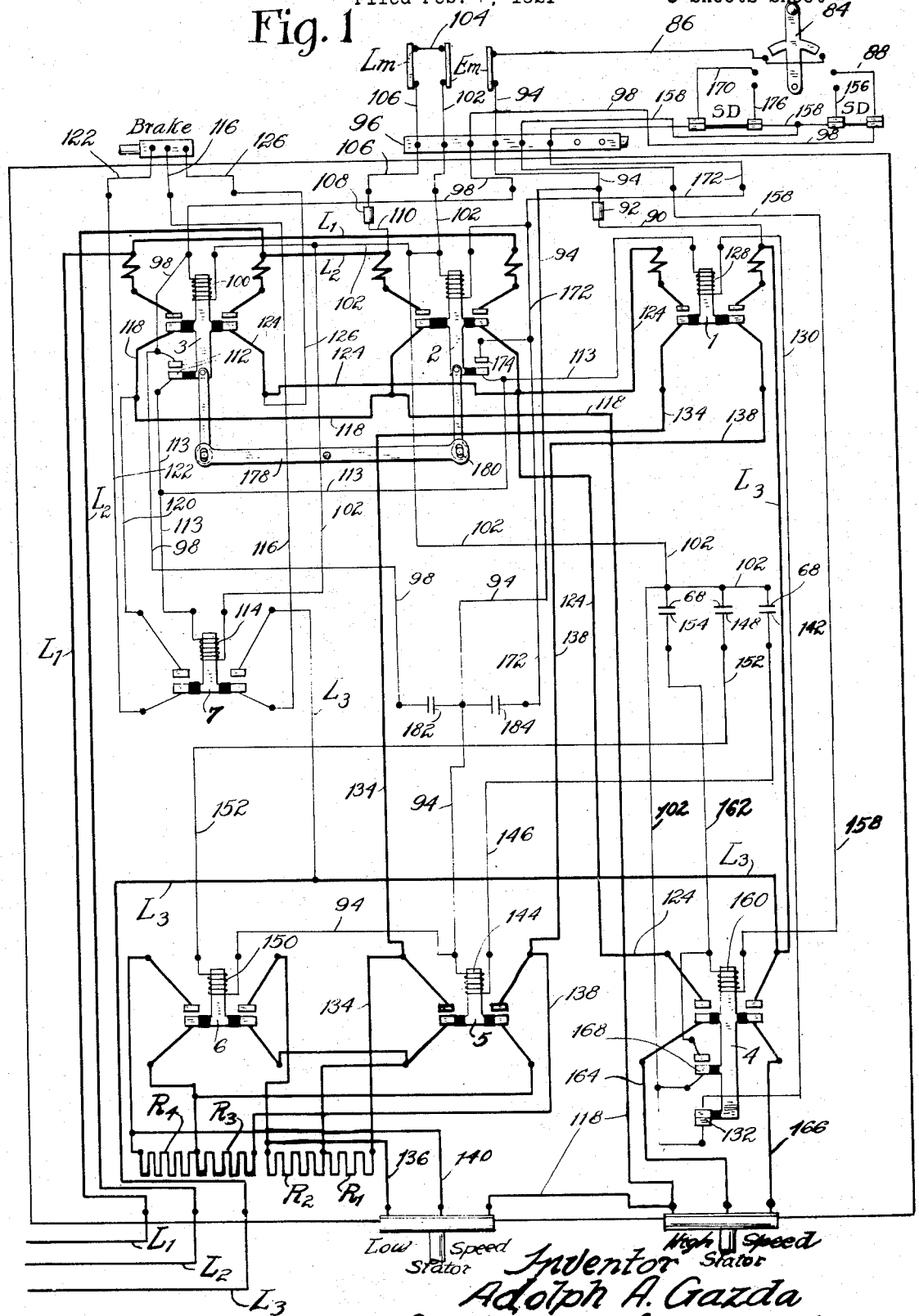
Figure 2:
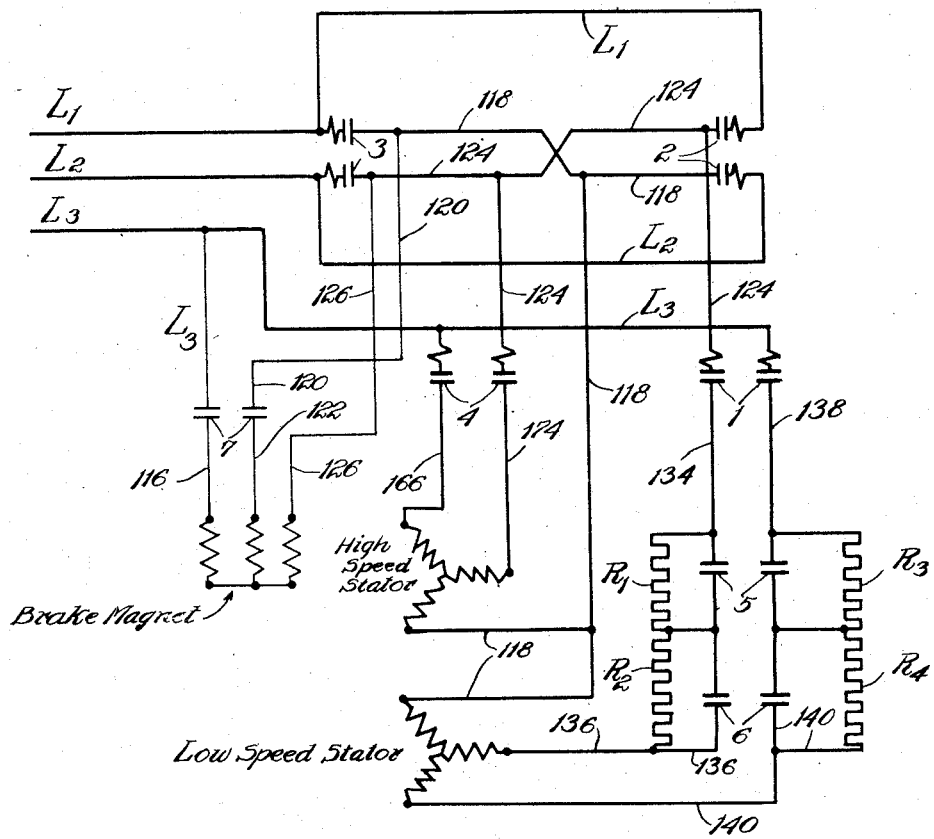
Figure 3:
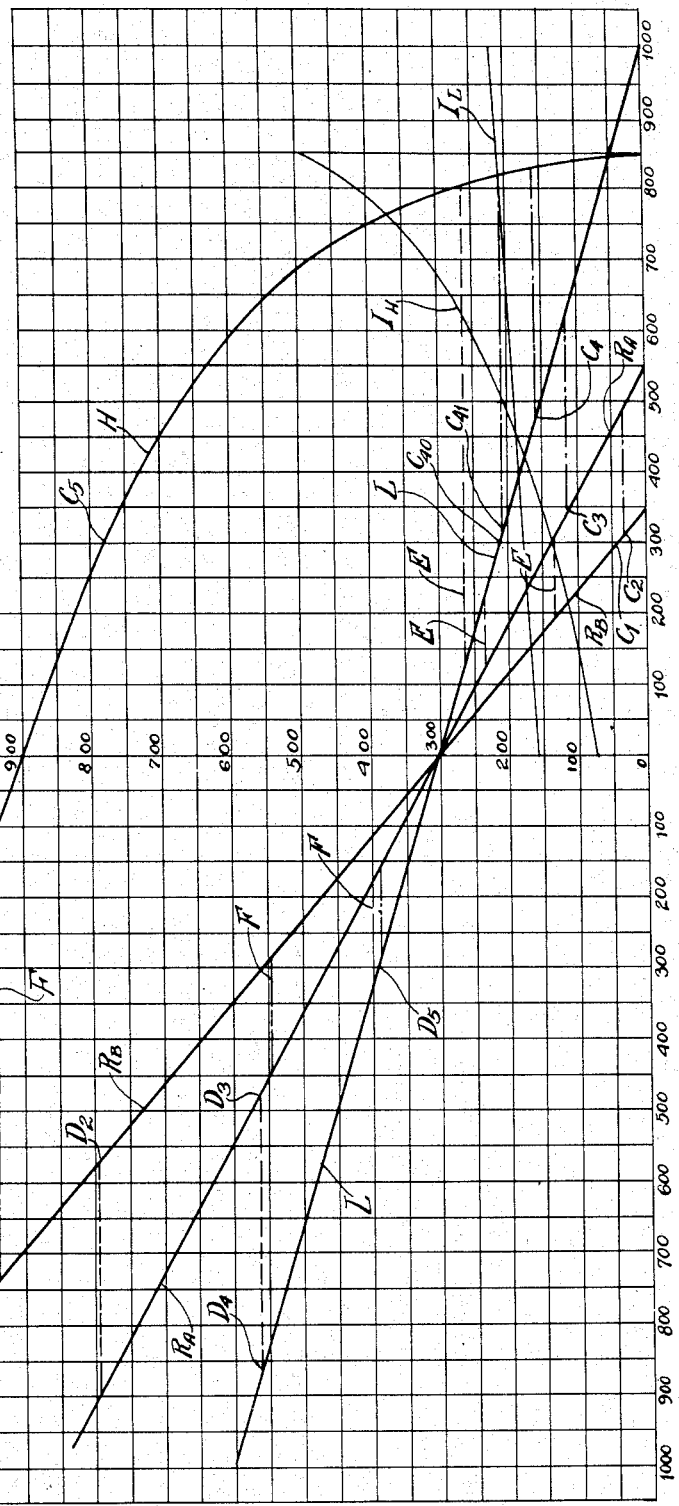
Figure 4:
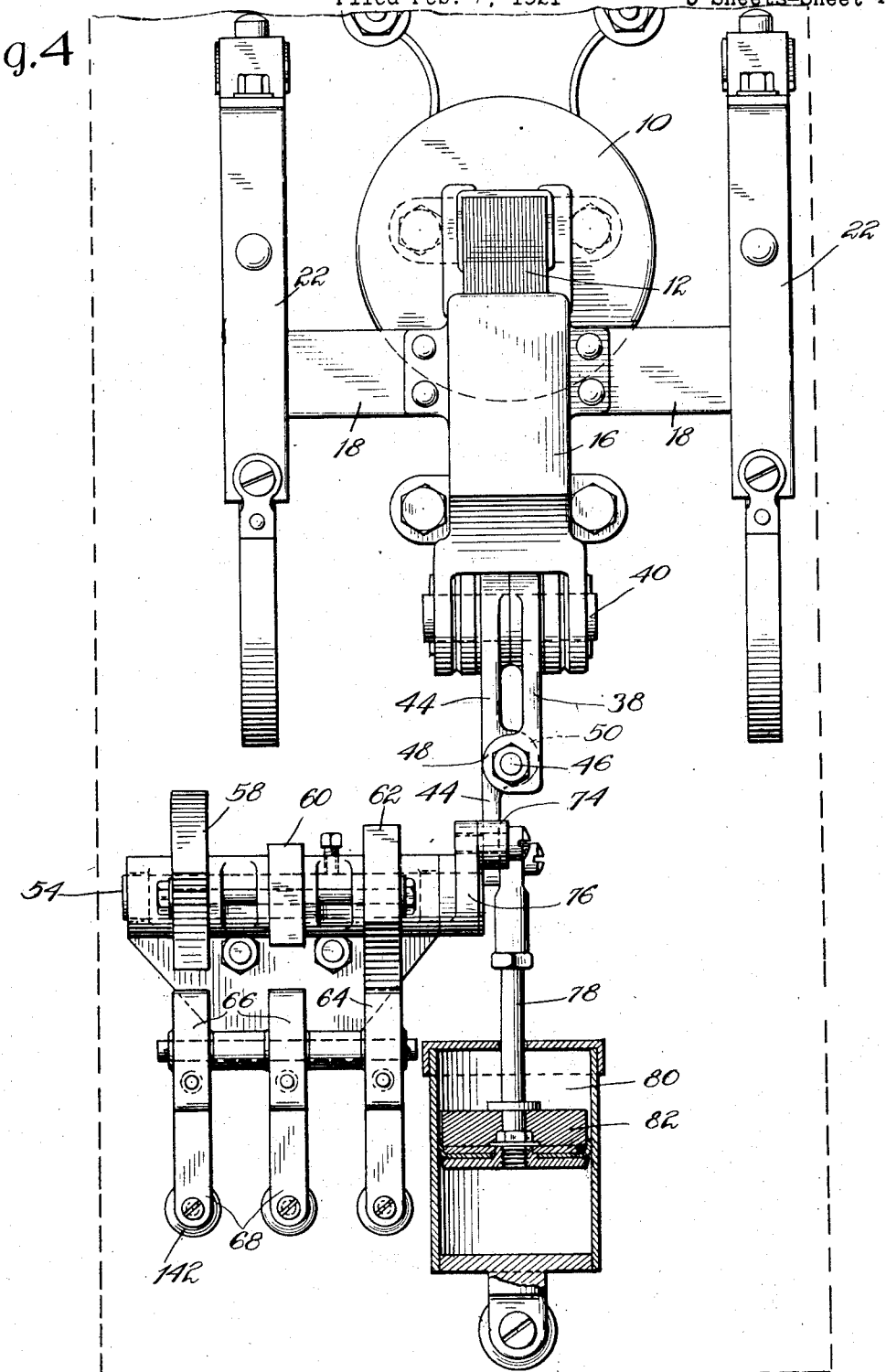

In the accompanying drawings, Figure 1 is a wiring diagram of the control board showing all the control circuits. Fig. 2 is a wiring diagram showing the power circuits only. Fig. 3 is a speed-torque diagram. Fig. 4 is a front elevation and Fig. 5 a side elevation of the low speed relay and my improved dashpot. Fig. 6 is a plan view of the cams moved by the relay for controlling the accelerating and decelerating circuits, and Fig. 7 is a side elevation of the parts shown in Fig. 6.

Referring first to Figs. 4 to 7, inclusive, I have illustrated an alternating current relay comprising a stationary U-shaped magnet equipped with a coil 10 and adapted to attract an armature 12 to move the relay. The armature 12 is pivoted at 14 on the vertical arm 16 of a bell crank lever, which vertical arm carries laterally projecting cross pieces 18 having switch supports 20 at their ends. Each switch support 20 abuts the movable switch member 22 at 24 and when the switch is open at 26 also, the switch being held against the support by the force of the compression spring 28 acting on a bolt 30 carried by the switch arm 22. When the relay is actuated, the switch arm 22 will carry contact 32 against the stationary contact 34 and subsequent movement of the armature and support 20 into the position shown in Fig. 5 will separate the upper end of the support from the switch arm, compressing spring 28 and rocking the switch arm slightly to shift the point of contact between contacts 32 and 34. Movement of the switch into the open position is limited by the ends of the horizontal arms 36 of the bell crank lever striking the supporting structure above them. A small bell crank lever 38 is pivoted on the same pintle 40 as the main armature-carrying lever and rotates in unison with it, being connected thereto by a pin 42. Also pivoted on pintle 40 is a downwardly extending arm 44 having a lost motion connection with bell crank lever 38, said connection comprising a bolt 46 passing through the ears 48 and 50 carried by the bell crank lever 38 and the arm 44 respectively, and a compression spring 52 on the bolt tending to hold the arm in contact with the lever.

A horizontal shaft 54 is supported below the relay by suitable brackets 56 and carries three cams 58, 60 and 62 set at different angles with respect to the shaft as shown in Fig. 7 and adapted to engage heels 64 of pivoted switch members 66 carrying contact arms 68 to operate control circuits hereinafter described. Suitable leaf springs 70 normally hold the contacts 68 in closed position. A bell crank lever 72 fastened on the shaft 54 carries a roller 74 lying in the path of movement of arm 44 and its horizontal arm 76 is connected to the vertical rod 78 entering the dashpot 80. The piston 82 in the dashpot is similar to the well known bicycle pump piston and is arranged to move upward slowly with considerable resistance, and to move downward quickly with a slight resistance. Upon operation of the relay to close the switch, bell crank lever 38 will immediately move to its final position but arm 44 will encounter roller 74 and separate from the lever, compressing spring 52. The spring 52 will gradually bring the arm 44 back against the lever, rotating shaft 54, raising the piston 82 in dashpot 80 and permitting the contacts shown to close one after another in a predetermined time sequence.

Referring next to Figs. 1 and 2 in which I have illustrated the preferred arrangement of wiring for my improved system, the control board carries seven relays, the slow speed relay 1, hereinabove described in detail, down and up reversing relays 2 and 3, a high speed relay 4, accelerating relays 5 and 6, and a brake relay 7. The controller is diagrammatically illustrated at 84 and the three power mains $L_1$, $L_2$ and $L_3$ are connected to the board at the lower left-hand corner.

Starting up.

Upon movement of the controller to the right, as illustrated in Fig. 1, to connect wires 86 and 88, control circuits are established as follows: from power main $L_3$ where it connects with relay 1 through wire 90, safety device 92 and wire 94 passing through a terminal box 96; emergency device $Em$, and wire 86 to the controller, thence through wire 88, contacts of slow down device SD, and wire 98 passing through terminal box 96 to one terminal of the winding 100 of the up reversing relay 3; through the winding 100, wire 102, emergency device $Em$, wire 104, limit switch $Lm$, back through wire 106, safety device 108 and wire 110 to $L_2$ where it connects with reversing relay 2. The power thus delivered closes the up reversing relay 3.

Closure of the relay 3 completes a control circuit for the brake relay 7 as follows: from wire 98 through contacts 112 carried by the relay, wire 113, winding 114 for relay 7, and wire 102 which connects with $L_2$ as above outlined. Winding 114 is thus connected in shunt with winding 100 across the line. Operation of relay 7 connects $L_3$ through wire 116 to one of the terminals of the brake magnet and $L_1$ through wire 118 which has been connected to $L_1$ by relay 3, wire 120, relay 7 and wire 122 to another terminal of the brake magnet. As the third terminal is already connected to $L_2$ by relay 3 through wire 126, power will be supplied to the brake magnet to relieve the brake.

Closure of relay 3 also completes a control circuit for the low speed relay 1 as follows: from contacts 112 through wire 113 to the winding 128 for relay 1 and thence through wire 130, back contacts 132 on relay 4, to wire 102 which connects with $L_2$ as above set forth. This places the winding 128 for relay 1 also in shunt with winding 100 operating relay 1 to supply power to the motor.

Closure of relay 1 delivers power to the low speed stator as follows: $L_1$ is already connected by relay 3 through wire 118. $L_2$ is connected through relay 3, wire 124, relay 1, wire 134, through resistance sections $R_1$ and $R_2$ and wire 136. $L_3$ is connected through relay 1, wire 138, resistance sections $R_3$ and $R_4$ and wire 140. The motor will accordingly start.

Acceleration.

As spring 52 operates to rotate the cams against the resistance of dashpot 80, contacts 68 and 142 will be closed supplying power to the operating coil of relay 5 as follows: from $L_3$ where it connects with relay 1, through wire 90, safety device 92, wire 94, winding 144 of relay 5, wire 146, contacts 142 and 68, wire 102, emergency device $Em$, wire 104, limit switch $Lm$, wire 106, safety device 108 and wire 110 to $L_2$. The resulting closure of relay 5 will short circuit sections of resistance $R_1$ and $R_3$ to accelerate the motor. After another time interval, contacts 68 and 148 will be closed by the next cam, supplying power to the operating coil of relay 6 as follows: from $L_3$ where it connects with relay 1 through wire 90, safety device 92, wire 94, winding 150 of relay 6, wire 152, contacts 148 and 68, wire 102 and thence to $L_2$ as above outlined. The resulting closure of relay 6 will short circuit the remaining sections $R_2$ and $R_4$ of resistance connecting the low speed stator directly across the line.

High speed.

The motor will continue to operate at low speed until the high speed relay 4 is operated which may occur in either one of two ways.

First. If the controller is moved to high speed position before spring 52 operates to close contacts 68 and 154, the closure of these last mentioned contacts will complete the control circuit for the high speed relay as follows: from $L_3$ where it connects to relay 1 through wire 90, safety device 92, wire 94, emergency device $Em$, wire 86, controller 84, wire 156, contacts of safety device SD, wire 158, winding 160 of relay 4, wire 162, contacts 154 and 68, wire 102 and to $L_2$ as above outlined.

Second. If the controller is left in low speed position for any length of time, contacts 68 and 154 will close completing the control circuit for the high speed relay 4 except for a break at the controller so that when the controller is subsequently moved to high speed position, the high speed relay will immediately be operated. Closure of relay 4 will supply power to the high speed stator of the motor as follows: $L_1$ is already connected through relay 3, and wire 118. $L_2$ is now connected through relay 3, wire 124, relay 4, and wire 164; and $L_3$ is connected through relay 4 and wire 166. Closure of relay 4 will also close contacts 168 which through wires 162 and 102 will shunt contacts 68 and 154 so that as long as the controller is kept in high speed position, relay 4 will remain closed regardless of the subsequent opening of contacts 68 and 154. Relay 4 also operates to open contacts 132 which are in the power circuit for the operating coil of relay 1. Upon closure of relay 4, therefore, relay 1 falls open and the three contacts 142, 148 and 154 also separate from contacts 68, interrupting the power supply to the operating coils of relays 5 and 6 which are therefore open.

High to low speed.

If the controller is subsequently moved back from the high speed position to the low speed position, the power to the operating coil of relay 4 will be interrupted and relay 4 will open. This will not only interrupt the supply of power to the high speed stator but will again connect the control circuit through contacts 132 for supplying power to the operating coil of relay 1 which will close and immediately connect the low speed stator through all the accelerating resistance. As contacts 142 and 148 are closed in timed sequence by the dashpot, the accelerating resistance will be cut out, ultimately connecting the low speed stator directly across the line. The final closure of contact 154 will position the parts so that the operator can go back into high speed if desired at any time. The control for moving downward is precisely similar to that for moving upward except that relay 2 is operated instead of relay 3 which interchanges $L_1$ and $L_2$ in their connections to the motor so that the high and low speed fields will both rotate in the opposite direction.

Upon reference to Fig. 1 it will be noted that wires 170 and 172 correspond to wires 88 and 98 for operation of reversing relay 2 through circuits which are otherwise completely identical, and that wire 113 is connected by contacts 174 on relay 2, corresponding to contacts 112 on relay 3. Wire 176 is also equivalent to wire 156 for connecting wire 158 to operate the high speed relay 4.

To prevent simultaneous operation of relays 2 and 3, which would obviously short circuit the power mains, any suitable interlock may be employed. I have illustrated a mechanical interlock comprising a centrally pivoted lever 178 the ends of which are connected by upwardly extending links to the moving parts of relays 2 and 3. The pivotal connections between the links and the lever are slotted as at 180 to allow a total amount of play only a trifle larger than the movement of one relay. Closure of either relay will take up this play and mechanically prevent operation of the other relay.

The safety devices SD are operated by the car as it approaches the top or bottom of the hatchway. Opening of these contacts completely interrupts all the control circuits on the board and the opening of relay 7 will permit the brake to stop the motor.

For the convenience of electricians testing the system, I provide manually operable switches 182 and 184 located on the board. Switch 182 completes the control circuit for relay 3 from $L_3$ through wire 90, safety device 92, wire 94, switch 182, wire 98, winding 100, wire 102 and to $L_2$ as above outlined, and switch 184 similarly operates relay 2.

Operation.

In Fig. 3 I have graphically illustrated the operation of my improved control system. In this figure the vertical distances correspond to speed and horizontal distances to torque. The curves extend on both sides of the speed axis to indicate both positive and negative torques. Curve H indicates for each speed the torque exerted by the motor in case the high speed stator is receiving power. Similarly curve L indicates torques corresponding to various speeds when the slow speed stator is connected directly across the line. Curve $R_A$ indicates the torques when relay 6 is open connecting part of the accelerating resistance in series with the low speed stator, and curve $R_B$ indicates the torques when relay 5 is also open and all the accelerating resistance is connected in.

The operation of the device is as follows: Assuming for purposes of illustration that the car is to be started up with its maximum safe load, which load will require 300 units of torque to raise it at a uniform speed, closure of relay 1 will result in operation of the motor on performance curve $R_B$. If the motor were kept on this curve indefinitely, point $C_i$ would ultimately be reached indicating an excessively slow speed. The excess of torque above 300 units is available to accelerate the car and by the time the dash pot control cams have operated to close relay 5 which shifts the motor to performance curve $R_A$, some such point as $C_2$ will be reached. The torque will immediately change to a larger value, resulting in further acceleration along performance curve $R_A$ to such point as $C_3$ when operation of the next accelerating control circuit will close relay 6 changing the motor over to performance curve L and again increasing the torque. If the control switch has been thrown directly into the high speed position the time interval elapsing before relay 4 will close and change the motor over to performance curve H will depend on the third dashpot control contact which will operate at some such point as $C_4$ again increasing the torque. This last change throws in the high speed stator resulting in acceleration until a uniform speed is reached at $C_5$ which on this particular diagram corresponds to 780. R. P. M.

If, on the other hand, the operator holds the control lever at slow speed, he can drive the motor continuously at a speed indicated by point $C_{40}$ on performance curve L which is only a trifle in excess of 200 R. P. M., or if he holds the controller in low speed position until he feels no further acceleration, point $C_{41}$ might be reached before the high speed stator would be thrown in. It will be seen that in starting an excessive torque of approximately 1000 units would be developed if the accelerating resistance were not automatically included in the circuit.

Assume next that the car is moving down with its maximum safe load, a condition indicated at point D on performance curve H and the operator desires to slow down. Movement of the control lever to slow speed position will open relay 4 and close relay 1 shifting the motor to performance curve $R_B$ and developing negative torque indicated by point $D_1$ which happens to be about 830 units. This will rapidly slow down the car until some such point as $D_2$ is reached at which point the closure of relay 5 will shift the motor to performance curve $R_A$ again increasing the braking effect. The last shift will be from point $D_3$ on performance curve $R_A$ to point $D_4$ on performance curve L, after which the motor will continue to slow down to point $D_5$ and operate thereafter at a constant speed. It will be seen that changing from performance curve H to performance curve L or even performance curve $R_A$ would result in negative torques far beyond the safe strength of the apparatus, which torques would break some part of the mechanical transmission or blow the fuses in the electrical power mains or both. The same set of accelerating mechanisms operates to prevent excessive acceleration in starting and excessive deceleration in stopping. When operating on lighter loads, the same general effect will be produced as indicated by dotted lines E for starting and by dash and double dot lines F for stopping.

While it might be possible to start on performance curve H so far as the mechanical transmission is concerned, the electrical efficiency of the high speed stator is very low at slow speeds. This is indicated by current curves $I_L$ and $I_H$ according to which the low speed stator will develop 1000 torque units, with a current of 220 amps., whereas the high speed stator cannot develop more than 850 torque units and requires 550 amps. for the purpose.

While I have illustrated and described in detail the preferred embodiment of my invention, it should be clearly understood that the disclosure is merely for the purpose of illustration and that many modifications and variations will naturally occur to those skilled in the art. I aim in the subjoined claims to cover all such legitimate variations and modifications.

I claim as my invention:

1. In electrical power equipment, a controller, a motor, a set of switches and resistances for automatically and progressively bringing the motor through a speed gradient to a predetermined final speed, another switch for bringing the motor to a different predetermined final speed, and means beyond the control of the operator for preventing operation of said last mentioned switch until said set of switches has finished its automatic action.

2. In electrical power equipment, a controller, a motor, a set of switches and resistances for automatically and progressively bringing the motor through a speed gradient to a predetermined final speed, another switch for bringing the motor to a different predetermined final speed, and means beyond the control of the operator for preventing operation of said last mentioned switch until said set of switches has finished its automatic action, and for a predetermined length of time thereafter.

3. In electrical power equipment, a controller, a motor, a set of switches and resistances for automatically bringing the motor through a series of speeds in timed sequence into a predetermined final speed, and another switch for putting the motor into a different final speed, the actuation of said last mentioned switch operating to automatically return said set of switches to initial position.

4. In electrical power equipment, a motor, a controller, a low speed switch arranged to be controlled by said controller, a set of resistances and resistance switches, a set of contacts arranged to close automatically in predetermined timed sequence after closure of said low speed switch, certain of said contacts operating to close said resistance switches in predetermined sequence, a high speed switch, the last of said contacts operating to partially establish a connection for closure of said high speed switch, said connection being completed by movement of the controller to high speed position and two additional contacts carried by said high speed switch and operating simultaneously therewith, one contact closing to complete a circuit for holding said high speed switch closed independently of the last contact of said first mentioned set of contacts, and the other contact opening to interrupt the supply of power for holding said low speed switch closed.

5. In electrical power equipment, a motor, a controller, a low speed switch arranged to be controlled by said controller, a contact arranged to close a predetermined time after closure of said low speed switch, a high speed switch, said contact operating to partially establish a connection for closure of said high speed switch, said connection being completed by movement of the controller to high speed position, and two additional contacts carried by said high speed switch and operating simultaneously therewith, one contact closing to complete a circuit for holding said high speed switch closed independently of the last contact of said first mentioned set of contacts, and the other contact opening to interrupt the supply of power for holding said low speed switch closed.

6. In electrical power equipment, a motor, a controller, a low speed switch arranged to be controlled by said controller, a set of resistances and resistance switches, a set of contacts arranged to close automatically in predetermined timed sequence after closure of said low speed switch, certain of said contacts operating to close said resistance switches in predetermined sequence, a high speed switch, the last of said contacts operating to partially establish a connection for closure of said high speed switch, said connection being completed by movement of the controller to high speed position, and two additional contacts carried by said high speed switch and operating simultaneously therewith, one contact closing to complete a circuit for holding said high speed switch closed independently of the last contact of said first mentioned set of contacts, and the other contact opening to interrupt the supply of power for holding said low speed switch closed, the set of contacts controlled by said low speed switch being arranged to open immediately upon opening of said low speed switch.

7. In electrical power equipment, a motor, a controller, a low speed switch arranged to be controlled by said controller, a contact arranged to close automatically some time after closure of said low speed switch, a high speed switch, and connections operative to close said high speed switch only when said contact is closed and said controller is in high speed position.

8. In an electrical power equipment, a motor having a high speed winding and a low speed winding, and means for connecting resistance in series with the low speed winding whenever the controller is moved to low speed position for a predetermined length of time whereby the positive torque developed in accelerating to low speed and the negative torque developed in slowing down to low speed are both controlled.

9. In electrical power equipment, a motor, a controller, a low speed switch arranged to be controlled by the controller, a contact arranged to close a predetermined time after closure of said low speed switch, a high speed switch, said contact operating to partially establish a connection for closure of said high speed switch, said connection being completed by movement of the controller to high speed position, and two additional contacts carried by said high speed switch and operating simultaneously therewith, one contact closing to complete a circuit for holding said high speed switch closed independently of the first mentioned contact, and the other contact opening to interrupt the supply of power for holding said low speed switch closed.

10. In electrical power equipment, a motor, a controller, a low speed switch arranged to be controlled by said controller, a resistance switch arranged to close automatically a predetermined time after closing of said low speed switch, a contact arranged to close automatically a predetermined time after said resistance switch, a high speed switch, connections operative to close said high speed switch only when said contact is closed and said controller is in high speed position, a contact operated by closure of said high speed switch for holding it closed as long as the controller remains in high speed position, and means also operated by closure of said high speed switch for disconnecting said low speed switch and allowing it to open.

11. In electrical power equipment, a motor having high speed and low speed windings with different operating characteristics, and a single automatic mechanical means for preventing the development of excessive torques in accelerating from no speed to the speed determined by the load and either the low or high speed windings, and also in decelerating from the speed determined by the load and the high speed winding to the speed determined by the load and the low speed winding.

12. In electrical power equipment, a motor having a low speed and a high speed winding, control circuits and mechanical means for automatically operating said control circuits in accelerating from no speed to low speed and for automatically preventing connection to the high speed winding at excessively low speeds, said identical mechanical means and control connections also operating to control the circuits to the low speed winding in the same identical way for preventing the development of excessive torques in slowing down from high speed to low speed.

13. In electrical power equipment, a motor, a controller, a low speed switch arranged to be controlled by said controller, a contact arranged to close a predetermined time after closure of said low speed switch, a high speed switch, said contact operating to partially establish a connection for closure of said high speed switch, said connection being completed by movement of the controller to high speed position, a contact carried by said high speed switch and operating simultaneously therewith to complete a circuit for holding said high speed switch closed independently of the first mentioned contact.

14. In electrical power equipment, a motor, a controller, a low speed switch arranged to be controlled by said controller, a resistance switch, a set of contacts arranged to close automatically in predetermined timed sequence after closure of said low speed switch, certain of said contacts operating to close said resistance switch, a high speed switch, the last of said contacts operating to partially establish a connection for closure of said high speed switch, said connection being completed by movement of the controller to high speed position, and two additional contacts carried by said high speed switch and operating simultaneously therewith, one contact closing to complete a circuit for holding said high speed switch closed independently of the last contact of said first mentioned set of contacts, and the other contact opening to interrupt the supply of power for holding said low speed switch closed.

15. In electrical power equipment, a motor capable of operating at either of two speeds, a low speed circuit and a high speed circuit, and mechanical means automatically operative when the motor is changed from high speed to low speed or from no speed to low speed to cut down the torques developed by the motor until the speed has changed sufficiently to permit operation on the low speed circuit.

16. An electrical power equipment, a plurality of control circuits, mechanical means for closing said circuits in predetermined timed sequence, electromagnetic means for operating said mechanical means, and connections arranged to actuate said electromagnetic means at the will of the operator to close said circuits and change the control circuits through a predetermined sequence of conditions into a predetermined final condition regardless of the previous condition of the circuits.

17. In electrical power equipment, a controller, a motor having a plurality of windings which will operate at a plurality of different speeds, a set of switches and resistances controlled thereby associated with one of said windings, and control circuits operative to position said switches in a predetermined initial condition when the controller is not in the position for actuating them.

18. In electrical power equipment, a low speed switch, a controller, means for closing said low speed switch when said controller is in low speed position and for opening it when said controlled is in any other position, and means for operating a set of contacts in predetermined timed sequence after closure of said low speed switch and for returning said contacts immediately to initial position upon opening said low speed switch, said last mentioned means comprising a one way dashpot mechanically connected with the contacts, a lost motion connection between the contacts and the switch, and resilient means tending to prevent lost motion.

19. In electrical power equipment, a low speed switch, a controller, means for closing said low speed switch when said controller is in low speed position and for opening it when said controller is in any other position, and means for automatically operating a contact a predetermined time after movement of said switch to one position and for returning said contact immediately to initial position upon movement of said switch to the other position.

In testimony whereof, I have hereunto set my hand.

ADOLPH A. GAZDA.